United States Patent [19]

Senjo et al.

[11] 4,035,470

[45] July 12, 1977

[54] PROCESS FOR REMOVING SULFUR OXIDES AND/OR NITROGEN OXIDES FROM WASTE GAS

[75] Inventors: Teizo Senjo, Machida; Makio Kobayashi, Toyonaka, both of Japan

[73] Assignees: Fuji Kasui Engineering Co., Ltd., Tokyo; Sumitomo Metal Industries, Ltd., Osaka, both of Japan

[21] Appl. No.: 594,754

[22] Filed: July 10, 1975

[30] Foreign Application Priority Data

Nov. 2, 1974 Japan .............................. 49-126957
Nov. 25, 1974 Japan ............................. 49-134362

[51] Int. Cl.² .................. C01B 21/00; C01B 17/00
[52] U.S. Cl. ............................. 423/235; 423/242; 423/243
[58] Field of Search ........... 423/235, 242, 351, 243

[56] References Cited

U.S. PATENT DOCUMENTS

| | | | |
|---|---|---|---|
| 3,023,076 | 2/1962 | Karwat | 423/235 |
| 3,635,657 | 1/1972 | Bressan et al. | 423/235 |
| 3,695,828 | 10/1972 | Gertsen et al. | 423/351 |
| 3,773,897 | 11/1973 | Fields et al. | 423/235 |
| 3,836,630 | 9/1974 | Noguchi et al. | 423/242 |
| 3,843,771 | 10/1974 | Urban | 423/242 |
| 3,906,080 | 9/1975 | Gorin et al. | 423/242 |
| 3,920,421 | 11/1975 | Collins | 423/242 |

FOREIGN PATENT DOCUMENTS

| | | | |
|---|---|---|---|
| 1,272,882 | 11/1960 | France | 423/235 |
| 1,454,723 | 11/1965 | France | 423/235 |
| 1,251,900 | 11/1967 | Germany | 423/235 |
| 45-3521 | 5/1966 | Japan | 423/242 |

*Primary Examiner*—O. R. Vertiz
*Assistant Examiner*—Eugene T. Wheelock
*Attorney, Agent, or Firm*—Armstrong, Nikaido & Marmelstein

[57] ABSTRACT

Sulfur oxides and/or nitrogen oxides are removed from waste gas containing the same by adding chlorine dioxide or ozone gas to the waste gas in case where nitrogen monoxide is contained in the waste gas, and by scrubbing the waste gas with an aqueous scrubbing solution containing the sulfite of alkali metals or ammonium and oxidation retardant consisting of the sulfide, polysulfide or thiosulfate, of alkali metals or ammonium and thiourea.

22 Claims, No Drawings

PROCESS FOR REMOVING SULFUR OXIDES AND/OR NITROGEN OXIDES FROM WASTE GAS

The present invention relates to the purification of waste gases, and more specifically relates to improvements in or relating to a process for removing sulfur oxides (SOx), or SOx and nitrogen oxides (NOx), from waste gases containing the same, such as, for example, flue gas from a boiler, heating furnace, sintering furnace, roasting furnace, converter, smelting furnace, incinerator or the like. This invention also relates to improvements in or relating to a process for removing NOx from waste gases containing the same, such as, for example, flue gases, tail gases from nitric acid plants, waste gases from metal dissolving and pickling plants and other gases containing NOx.

Due to rapidly increasing industrial production in various countries, SOx, especially sulfur dioxide ($SO_x$) and NOx, especially nitrogen monoxide (NO) and nitrogen dioxide ($NO_2$), discharged from waste gases have caused serious problems in air pollution. In order to prevent such air pollution due to SOx and/or NOx, various gas desulfurization and denitrogenation processes have been developed.

Various processes for removing SOx and/or NOx from waste gases are well-known in the art. Processes for removing SOx from waste gases by using an aqueous sulfite solution as a scrubbing solution, have been developed, such as those disclosed in U.S. Pat. Nos. 3,477,815, 3,485,581, 3,607,037, 3,607,038, and 3,607,039. In these desulfurization processes, sulfur dioxide ($SO_2$) contained in the waste gases is absorbed by the following reaction (1) with the sulfite.

(1) $SO_2 + M_2SO_3 + H_2O \rightarrow 2MHSO_3$ wherein M represents alkali metals such as Na and K, and ammonium ($NH_4$).

The desulfurization processes using the sulfite scrubbing agent have the advantages that: (1) the desulfurization rate is high; (2) the field construction cost is relatively low, and; (3) stable operation is easily accomplished. However, in the conventional desulfurization processes using the sulfite scrubbing agent, there is a problem that the sulfite contained in the scrubbing solution is wastefully consumed by the following reaction (2) with oxygen contained in the waste gas to be treated.

(2) $M_2SO_3 + \frac{1}{2}O_2 \rightarrow M_2SO_4$ wherein M represents the same as defined above.

That is, the sulfite of alkali metals or ammonium for scrubbing SOx is converted into the sulfate of the same, which cannot act as a scrubbing agent for SOx.

Process for removing NOx, or NOx and SOx from waste gases by using an aqueous sulfite scrubbing solution have been also developed, such as those disclosed in Japanese Patent Laying-Open Publication Nos. Sho 50-1964 (1975) and Sho 50-27763 (1975) and our co-pending U.S. Pat. appln. Ser. No. 486,424 of Senjo and Kobayashi filed July 8, 1974.

In these processes, NOx contained in the waste gases is reduced to nitrogen gas by the following reaction (6) or (7) with the sulfite after nitrogen monoxide (NO) contained in the waste gas has been converted into nitrogen dioxide ($NO_2$) and/or dinitrogentrioxide ($N_2O_3$) by the following reaction (3), (4) or (5) with chlorine dioxide ($ClO_2$) or ozone ($O_3$), and removed from the waste gas by the following reaction (6) or (7).

(3) $4NO + 2ClO_2 + 2H_2O \rightarrow 2NO_2 + 2HCl + 2HNO_3$
(4) $NO + O_3 \rightarrow NO_2 + O_2$
(5) $2NO + O_3 \rightarrow N_2O_3 + O_2$
(6) $NO_2 + 2M_2SO_3 \rightarrow \frac{1}{2}N_2 + 2M_2SO_4$
(7) $N_2O_3 + 3M_2SO_3 \rightarrow N_2 + 3M_2SO_4$ wherein M represents the same as defined above.

Thus, in order to oxidize NO contained in the waste gas to $NO_2$ and/or $N_2O_3$, $ClO_2$ or $O_3$ is firstly added to the waste gas at, for example, the feeding pipe or duct through which the waste gas to be treated is fed into a scrubber. Then, secondly, $NO_2$ and/or $N_2O_3$ thus oxidized and originally contained in the waste gas are scrubbed with an aqueous scrubbing solution containing the sulfite or alkali metals, or ammonium and are removed from the waste gas by the above-mentioned reduction reaction (6) or (7). However, in these processes there also is a problem that the sulfite contained in the scrubbing solution is wastefully consumed by the reaction (2), shown above, with $O_2$ contained in the waste gas.

That is, the sulfite for reducing $NO_2$ is converted into the sulfate, which does not reduce $NO_2$. In addition the oxidation reaction (2) of the sulfite with oxygen is accelerated in the presence of $NO_2$, which is a substance to be removed and is inevitablly contained in the waste gas to be treated.

Accordingly, the object of the present invention is to depress the oxidation reaction of said sulfite in the scrubbing solution for desulfurization and/or denitrogenation, caused by oxygen contained in the waste gases.

Other objects and advantages of the present invention will be apparent from the following description.

In accordance with the present invention, the oxidation reaction of said sulfite is depressed in a process for removing SOx from waste gases containing the same which process comprises contacting said gas with an aqueous scrubbing solution of the sulfite of at least one selected from the group consisting of alkali metals and ammonium in a scrubber, wherein (a) said scrubbing solution contains oxidation retardant consisting of the sulfide, polysulfide or thiosulfate of alkali metals or ammonium and thiourea in an amount of at least 0.0001 mol/l in the scrubbing solution and (b) a pH of said scrubbing solution is at least 6.

In accordance with the present invention, the oxidation reaction of said sulfite is also depressed in a process for removing NOx from a waste gas containing the same comprising the steps of adding $ClO_2$ or $O_3$ to the gas whereby NO contained in the gas is converted into $NO_2$ and/or $N_2O_3$, and the contacting the gas with an aqueous scrubbing solution of the sulfite of at least one selected from the group consisting of alkali metals and ammonium in a scrubber, wherein (a) said scrubbing solution contains oxidation retardant consisting of the sulfide, polysulfide or thiosulfate, of alkali metals or ammonium and thiourea in an amount of at least 0.03 mol/l in the scrubbing solution and (b) a pH of said scrubbing solution is at least 5.

In accordance with the present invention, the oxidation reaction of said sulfite is further depressed in a process for removing SOx and NOx from a waste gas containing the same comprising the steps of adding $ClO_2$ or $O_3$ to the gas whereby NO contained in the waste gas is converted into $NO_2$ and/or $N_2O_3$, and then contacting the gas with an aqueous scrubbing solution of the sulfite of at least one selected from the group consisting of alkali metals and ammonium in a scrubber, wherein (a) said scrubbing solution contains oxidation retardant consisting of the sulfide, polysulfide or thiosulfate, of alkali metals or ammonium and thiourea in an amount of at least 0.03 mol/l in the scrubbing solution and (b) the pH of said scrubbing solution is at least 5.

In accordance with the preferred embodiments of the present process for removing NOx, or SOx and NOx, from waste gases, the scrubbing solution further contains copper and/or iron ion in an amount of at least 0.003 mol/l in said scrubbing solution in order to further depress the oxidation reaction of said sulfite and to further increase the denitrogenation rate.

The oxidation retardant to be employed in the present invention for removing SOx and/or NOx from waste gases includes sulfide or polysulfide of alkali metals, such as sodium sulfide ($Na_2S$), potassium sulfide ($K_2S$), sodium polysulfides ($Na_2Sx$, $x = 2,3,4,...$) or potassium poly-sulfides ($K_2Sx$, $x = 2,3,4,...$). Said oxidation retardant also includes ammonium sulfide (($NH_4)_2S$) or ammonium polysulfides (($NH_4)_2Sx$, $x = 2,3,4,...$). Said oxidation retardant further includes thiosulfate such as, for example, sodium thiosulfate ($Na_2S_2O_3$), potassium thiosulfate ($K_2S_2O_3$), ammonium thiosulfate (($NH_4)_2S_2O_3$) or the like, and thiourea.

In accordance with the present process for removing SOx from a waste gas containing the same, said gas is scrubbed with an aqueous scrubbing solution containing the sulfite of alkali metals such as sodium (Na) and potassium (K), or ammonium ($NH_4$) and further containing said oxidation retardant, in a scrubber.

The amount of said oxidation retardant to be added to the scrubbing solution should be not less than 0.0001 mol/l in the scrubbing solution, and preferably is in the range from 0.001 to 0.1 mol/l. When the amount of said oxidation retardant to be added to the scrubbing solution is less than 0.0001 mol/l, the effect of the depression for the above-mentioned oxidation reaction of said sulfite with oxygen contained in the waste gas is not sufficiently accomplished and when the amount of said oxidation retardant is more than 0.1 mol/l, said effect is saturated so that it is not economical.

In the present desulfurization process, the pH of the scrubbing solution should be not less than 6, and preferably in the range from 7 to 8.5, and the concentration of said sulfite in the scrubbing solution is preferably not less than 0.1 mol/l, in order to remove SOx with high efficiency.

In the present desulfurization process, said sulfite contained in the aqueous scrubbing solution can be also prepared by the desulfurization reaction, by supplying the hydroxide of alkali metals or ammonium, or the carbonate of alkali metals or ammonium into the scrubbing solution.

In accordance with the present process for removing NOx from a waste gas containing the same, said gas is scrubbed with an aqueous scrubbing solution containing the sulfite of alkali metals such as Na and K or ammonium and containing said oxidation retardant after the oxidation treatment of NO with $ClO_2$ or $O_3$. The amount of said oxidation retardant to be added to the scrubbing solution should be not less than 0.03 mol/l in the scrubbing solution, and preferably is in the range from 0.05 to 0.4 mol/l in order to depress the oxidation reaction of said sulfite with oxygen contained in the waste gas.

In the present denitrogenation process, the pH of the scrubbing solution should not be less than 5, and preferably in the range from 6.5 to 8.5, and the concentration of said sulfite in the scrubbing solution should be not less than 0.1 mol/l in order to remove NOx from the waste gas with high efficiency.

In the present denitrogenation process, NO contained in the waste gas should be oxidized by $ClO_2$ or $O_3$ prior to scrubbing the waste gas with said scrubbing solution, and NO is converted into $NO_2$ and/or $N_2O_3$ as described above and shown in the equations (3), (4) and (5). $ClO_2$ or $O_3$ employed for oxidizing NO in the waste gas can be introduced into the waste gas either at the feeding duct through which the waste gas is fed into a scrubber or at an oxidation column where $ClO_2$ or $O_3$ is mixed with the waste gas prior to being fed into a scrubber. The oxidized gas including $NO_2$ and/or $N_2O_3$ is then scrubbed with said scrubbing solution, and thereby $NO_2$ and/or $N_2O_3$ contained in the gas is reduced into $N_2$ by the chemical reaction shown in the equation (6). The mol ratio of $ClO_2$ to NO is controlled so as to be substantially 0.5, and the mol ratio of $O_3$ to NO is controlled so as to be between 0.5 and 1.0.

In accordance with the present process for simultaneously removing SOx and NOx from a waste gas containing the same, said gas is scrubbed with an aqueous scrubbing solution containing the sulfite of alkali metals such as Na and K or ammonium and containing said oxidation retardant, after the oxidation treatment of NO with $ClO_2$ or $O_3$, as described above. The amount of said oxidation retardant to be added to the scrubbing solution should be not less than 0.03 mol/l in the scrubbing solution, and preferably is in the range from 0.05 to 0.4 mol/l in order to depress the oxidation reaction of said sulfite with oxygen contained in the waste gas.

In the present desulfurization and denitrogenation process, the pH of the scrubbing solution should be not less than 5, and preferably in the range from 6.5 to 8.5, and the concentration of said sulfite in the scrubbing solution should be not less than 0.1 mol/l in order to remove SOx and NOx from the waste gas with high efficiency.

In a preferred embodiment of the present process for removing SOx and NOx, said sulfite contained in the aqueous scrubbing solution can be prepared in the desulfurization reaction by supplying the hydroxide of alkali metals or ammonium, or the carbonate of alkali metals or ammonium into the scrubbing solution. The desulfurization reaction may be expressed by the following equation (8).

(8) $2MOH + SO_2 \rightarrow M_2SO_3 + H_2O$ 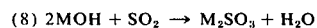

wherein M represents the same as defined above. Thus, sulfur dioxide ($SO_2$) contained in the waste gas is absorbed into an aqueous scrubbing solution containing the hydroxide as the sulfite of alkali metals or ammonium. In fact, as a large quantity of carbon dioxide ($CO_2$) contained in, for example, a combustion exhaust gas is dissolved in the scrubbing solution, said hydroxide supplied into the scrubbing solution is converted into the bicarbonate of alkali metals or ammonium in the following reaction (9).

(9) $MOH + CO_2 \rightarrow MHCO_3$ 

Therefore, in this case, $SO_2$ contained in the waste gas is scrubbed by the reaction of $SO_2$ with said bicarbonate as shown in the following equation (10).

(10) $2MHCO_3 + SO_2 \rightarrow M_2SO_3 + 2CO_2 + H_2O$

Copper and/or iron ion to be employed in the preferred present process for removing NOx, or SOx and NOx from a waste gas can be incorporated into the scrubbing solution in the form of, for example, copper sulfate, copper chloride, iron sulfate, iron chloride, chelate compound or complex compound of copper or iron. As the pH of the scrubbing solution of the present process should be not less than 5, copper of iron compound to be incorporated into the scrubbing solution is preferably in the form of chelate compound of copper or iron, or complex compound of copper or iron so as to be in the form of, not an insoluble compound but ionic state in the scrubbing solution. The chelating agent to be employed in the present process includes any conventional chelating agents such as, for example, ethylene diamine tetraacetic acid (EDTA) $[(CH_2)_2 N_2 (CH_2COOH)_4]$, citric acid $(C_6H_8O_7)$, tartaric acid $(C_4H_6O_6)$, gluconic acid $(C_6H_{12}O_7)$ and the like. The complex compound of copper or iron includes, for example, cupro-ammonium complex $[Cu(NH_3)_4]^{2+}$, ferrocyano complex $[Fe(CN)_6]^{4-}$ and the like. The amount of said copper and/or iron ion to be added to the scrubbing solution should be not less than 0.003 mol/l in the scrubbing solution, and preferably is in the range from 0.01 to 0.04 mol/l in the scrubbing solution.

The present invention is illustrated by, but by no means limited to, the following examples.

EXAMPLE 1

Oxidation tests of the sulfite were conducted by bubbling air into an absorbing solution containing 0.2 mol/l of sodium sulfite and absorbing solutions containing 0.2 mol/l of sodium sulfite and various amounts of the oxidation retardant after the pH of each absorbing solution was adjusted to 8.0. In the tests, air was continuously bubbled into flasks containing 200 ml of the various absorbing solutions, shown in the following Table 1, having a temperature of 40° C, for 30 minutes, at the rate of 2 liter/min. The rate of oxidation of the sulfite in the absorbing solution was obtained by determining the concentration of the residual sulfite in the air-blown absorbing solution with iodometric titration, and the oxidation retarding effect of the present oxidation retardant was confirmed. The results were shown in Table 1.

Table 1

| Run No. | Content of aqueous absorbing solution | | | Oxidation % of sulfite |
|---|---|---|---|---|
| 1 | 0.2 | mol/l | $Na_2SO_3$ | 59.5 |
| 2 | 0.2 | mol/l | $Na_2SO_3$ | 2.6 |
|   | 0.02 | mol/l | $Na_2S$ |   |
| 3 | 0.2 | mol/l | $Na_2SO_3$ | 6.7 |
|   | 0.02 | mol/l | $Na_2S_2O_3$ |   |
| 4 | 0.2 | mol/l | $Na_2SO_3$ | 6.0 |
|   | 0.02 | mol/l | $CS(NH_2)_2$ |   |
| 5 | 0.2 | mol/l | $(NH_4)_2SO_3$ | 2.5 |
|   | 0.02 | mol/l | $(NH_4)_2S$ |   |
| 6 | 0.2 | mol/l | $Na_2SO_3$ | 2.8 |
|   | 0.002 | mol/l | $Na_2S$ |   |
| 7 | 0.2 | mol/l | $Na_2SO_3$ | 6.0 |
|   | 0.0002 | mol/l | $Na_2S$ |   |
| 8 | 0.2 | mol/l | $Na_2SO_3$ | 38.0 |
|   | 0.00002 | mol/l | $Na_2S$ |   |

EXAMPLE 2

100,000 $NM^3$/Hr of flue gas from a boiler containing 1200 ppm of SOx was desulfurized in accordance with the following procedure.

Said flue gas having a temperature of 230° C was humidified with water in a water cooling chamber to thereby be cooled to 60°–65° C, and then fed to the bottom of a scrubbing column comprising a Moredana plate column (a plate column comprising perforated plate without weir and downcomer) having three perforated plates with a freespace ratio of 0.38, where said gas was brought into countercurrent contact with a circulating aqueous scrubbing solution having the following compositions under the following conditions.

| Compositions of the scrubbing solution: | | |
|---|---|---|
| $Na_2SO_3$ | 1.05 | mol/l |
| $Na_2SO_3$ | 1.04 | mol/l |
| $Na_2S$ | 0.0016 | mol/l |
| $Na_2SO_3$ | 0.013 | mol/l |
| Operating conditions: | | |
| superficial gas velocity in the column | | 5 m/sec |
| liquid-gas ratio (L/G) in the colum | | 3.5 |
| pH of the scrubbing solution | | 7.8 |
| make-up amount of $Na_2SO_3$ | | 8.5 kg/H |

A portion of the circulating scrubbing solution was continuously blown down, and sodium bisulfite obtained by the desulfurization reaction was converted, by heating treatment, into sodium sulfite, which was again utilized as a scrubbing agent in this experiment.

The SOx content in off-gas from the scrubbing column was not greater than 2 ppm.

COMPARATIVE EXAMPLE 1

A gas scrubbing test of the above flue gas was repeated in the same manner as in Example 2 except that $Na_2S$ was not contained in the scrubbing solution. In order to obtain the same desulfurization result as in Example 2, 150 kg/Hr of $Na_2SO_3$ had to be added into the scrubbing solution, which was much larger than that of Example 2. The composition of the circulating scrubbing solution was as follows.

| Compositions of the scrubbing solution: | |
|---|---|
| $Na_2SO_3$ | 0.45 mol/l |
| $NaHSO_3$ | 0.45 mol/l |
| $Na_2SO_4$ | 0.94 mol/l |

EXAMPLE 3

Oxidation tests of the sulfite were conducted by bubbling air containing 200 ppm of $NO_2$ into an absorbing solution containing 0.2 mol/1 of the sulfite and absorbing solutions containing 0.2 mol/2 of the sulfite and various amounts of the oxidation retardant. In the tests air and air containing $NO_2$ were bubbled into flasks containing 500 ml of the various absorbing solution shown in Table 2, for 30 minutes, at the rate of 10 liter/min.

The rate of oxidation of the sulfite in the absorbing solution was obtained by determining the concentration of the residual sulfite in the air-bubbled absorbing solution with iodometric titration, and the oxidation retarding effect of the present oxidation retardant was confirmed. The results were shown in Table 2.

Table 2

| Run No. | Content of aqueous absorbing solution | | | pH of aqueous absorbing solution | Oxidation % of sulfite |
|---|---|---|---|---|---|
| 1 | 0.2 | mol/l | $Na_2SO_3$ | 7.0 | 95 |
| 2 | 0.2 | mol/l | $(NH_4)_2SO_3$ | 7.0 | 96 |
| 3 | 0.2 | mol/l | $Na_2SO_3$ | 7.0 | 9 |
|   | 0.06 | mol/l | $Na_2S$ | | |
| 4 | 0.2 | mol/l | $(NH_4)_2SO_3$ | 7.0 | 8.8 |
|   | 0.06 | mol/l | $(NH_4)_2S$ | | |
| 5 | 0.2 | mol/l | $Na_2SO_3$ | 7.0 | 12 |
|   | 0.06 | mol/l | $Na_2S_2O_3$ | | |
| 6 | 0.2 | mol/l | $Na_2SO_3$ | 4.0 | 32 |
|   | 0.06 | mol/l | $Na_2S_2O_3$ | | |
| 7 | 0.2 | mol/l | $(NH_4)_2SO_3$ | 7.0 | 14 |
|   | 0.06 | mol/l | $(NH_4)_2S_2O_3$ | | |
| 8 | 0.2 | mol/l | $Na_2SO_3$ | 7.0 | 11 |
|   | 0.06 | mol/l | $SC(NH_2)_2$ | | |
| 9 | 0.2 | mol/l | $Na_2SO_3$ | 4.0 | 30 |
|   | 0.06 | mol/l | $SC(NH_2)_2$ | | |
| 10 | 0.2 | mol/l | $Na_2SO_3$ | 7.0 | 4.8 |
|    | 0.3 | mol/l | $Na_2S$ | | |
| 11 | 0.2 | mol/l | $Na_2SO_3$ | 7.0 | 9 |
|    | 0.3 | mol/l | $Na_2S_2O_3$ | | |
| 12 | 0.2 | mol/l | $Na_2SO_3$ | 7.0 | 9.5 |
|    | 0.3 | mol/l | $SC(NH_2)_2$ | | |

EXAMPLE 4

Absorption tests and oxidation tests of ammonium sulfite were conducted by bubbling air containing 500 ppm of $NO_2$ into an aqueous absorbing solution containing 0.37 mol/l of the sulfite and various aqueous absorbing solutions containing 0.2 mol/1 of the sulfite, various amounts of the oxidation retardant and/or the EDTA chelates of copper or iron. In the tests air containing $NO_2$ was bubbled into flasks containing 500 ml of the various absorbing solutions shown in the following Table 3, for 30 minutes at the rate of 10 liter/min.

The rate of absorption was obtained by determining the concentrations of $NO_2$ in the input and output gases of the flasks by using a chemical luminescence type NOx analyzer, and the rate of oxidation of the sulfite in the absorbing solution was obtained by determining the concentration of the residual sulfite in the air-blown absorbing solution with iodometric titration. The results were shown in Table 3.

Table 3

| Run No. | Content of aqueous absorbing solution | | | pH of aqueous absorbing solution | Denitrogenation rate (%) | Decreasing rate of $SO_3^{2-}$ m mol/H |
|---|---|---|---|---|---|---|
| 1 | 0.37 | mol/l | $(NH_4)_2SO_3$ | 6.5 | 82 | 650 |
| 2 | 0.37 | mol/l | $(NH_4)_2SO_3$ | 8.0 | 85 | 110 |
|   | 0.02 | mol/l | $Na_2S$ | | | |
| 3 | 0.37 | mol/l | $(NH_4)_2SO_3$ | 6.5 | 84 | 120 |
|   | 0.06 | mol/l | $(NH_4)_2S_2O_3$ | | | |
| 4 | 0.37 | mol/l | $(NH_4)_2SO_3$ | 6.5 | 90 | 125 |
|   | 0.06 | mol/l | $SC(NH_2)_2$ | | | |
| 5 | 0.37 | mol/l | $(NH_4)_2SO_3$ | 6.5 | 92 | 130 |
|   | 0.06 | mol/l | $SC(NH_2)_2$ | | | |
|   | 0.01 | mol/l | $EDTA-Cu^{2+}$ | | | |
| 6 | 0.37 | mol/l | $(NH_4)_2SO_3$ | 8.0 | 94 | 87 |
|   | 0.02 | mol/l | $Na_2S$ | | | |
|   | 0.01 | mol/l | $EDTA-Cu^{2+}$ | | | |
| 7 | 0.37 | mol/l | $(NH_4)_2SO_3$ | 6.5 | 96 | 85 |
|   | 0.06 | mol/l | $SC(NH_2)_2$ | | | |
|   | 0.01 | mol/l | $EDTA-Cu^{2+}$ | | | |
| 8 | 0.37 | mol/l | $(NH_4)_2SO_3$ | 6.5 | 95 | 95 |
|   | 0.06 | mol/l | $SC(NH_2)_2$ | | | |
|   | 0.01 | mol/l | $EDTA-Fe^{2+}$ | | | |
| 9 | 0.37 | mol/l | $(NH_4)_2SO_3$ | 6.5 | 97 | 80 |
|   | 0.06 | mol/l | $Na_2S_2O_3$ | | | |
|   | 0.01 | mol/l | $EDTA-Cu^{2+}$ | | | |
| 10 | 0.37 | mol/l | $(NH_4)_2SO_3$ | 6.5 | 97 | 90 |
|    | 0.06 | mol/l | $Na_2S_2O_3$ | | | |
|    | 0.01 | mol/l | $EDTA-Fe^{2+}$ | | | |
| 11 | 0.37 | mol/l | $(NH_4)_2SO_3$ | 6.5 | 96 | 55 |
|    | 0.03 | mol/l | $SC(NH_2)_2$ | | | |
|    | 0.03 | mol/l | $Na_2S_2O_3$ | | | |
|    | 0.01 | mol/l | $EDTA-Cu^{2+}$ | | | |
| 12 | 0.37 | mol/l | $(NH_4)_2SO_3$ | 6.5 | 96 | 90 |
|    | 0.06 | mol/l | $SC(NH_2)_2$ | | | |
|    | 0.006 | mol/l | $EDTA-Cu^{2+}$ | | | |
|    | 0.006 | mol/l | $EDTA-Fe^{2+}$ | | | |

EXAMPLE 5

Absorption tests and oxidation tests of sodium sulfite were conducted by bubbling air or air containing 100 ppm of $NO_2$ into an aqueous absorbing solution containing 0.18 mol/l of sodium sulfite and various aqueous absorbing solutions containing sodium sulfite and thiourea and/or the EDTA chelates of copper. In the tests said air was bubbled into flasks containing 500 ml of the various absorbing solutions shown in the following Table 4, for 30 minutes at the rate of 10 liter/min.

The results which were obtained as described in Example 4 were shown in Table 4.

Table 4

| Run No. | Content of aqueous absorbing solution | | | pH of aqueous absorbing solution | $NO_2$ content in blown-air (ppm) | Denitrogenation rate (%) | Decreasing rate of $SO_3^{2-}$ m mol/H |
|---|---|---|---|---|---|---|---|
| 1 | 0.18 | mol/l | $Na_2SO_3$ | 6.7 | 0 | — | 59.5 |
| 2 | 0.18 | mol/l | $Na_2SO_3$ | 6.7 | 100 | 91 | 13 |
|   | 0.01 | mol/l | $EDTA-Cu^{2+}$ | | | | |
| 3 | 0.18 | mol/l | $Na_2SO_3$ | 6.7 | 100 | 82 | 96 |
| 4 | 0.18 | mol/l | $Na_2SO_3$ | 6.7 | 100 | 91 | 15 |
|   | 0.06 | mol/l | $SC(NH_2)_2$ | | | | |
| 5 | 0.18 | mol/l | $Na_2SO_3$ | 6.7 | 100 | 96 | 5.3 |
|   | 0.06 | mol/l | $SC(NH_2)_2$ | | | | |
|   | 0.01 | mol/l | $EDTA-Cu^{2+}$ | | | | |

Table 4-continued

| Run No. | Content of aqueous absorbing solution | | | pH of aqueous absorbing solution | $NO_2$ content in blown-air (ppm) | Denitrogenation rate (%) | Decreasing rate of $SO_3^=$ m mol/H |
|---|---|---|---|---|---|---|---|
| 6 | 0.18 0.1 0.01 | mol/l mol/l mol/l | $Na_2SO_3$ $SC(NH_2)_2$ $EDTA-Cu^{2+}$ | 6.7 | 100 | 95 | 4.4 |
| 7 | 0.18 0.1 0.01 | mol/l mol/l mol/l | $Na_2SO_3$ $SC(NH_2)_2$ $EDTA-Cu^{2+}$ | 8.0 | 100 | 95 | 4.4 |
| 8 | 0.18 0.1 0.01 | mol/l mol/l mol/l | $Na_2SO_3$ $SC(NH_2)_2$ $EDTA-Cu^{2+}$ | 6.7 | 100 | 96 | 4.3 |

EXAMPLE 6

1000 Nm³/H of waste gas containing 1000 ppm of NO and 1000 ppm of $NO_2$ was denitrogenated in accordance with the following procedure.

520 ppm of $ClO_2$ was added into the waste gas at the feeding duct of the waste gas into the scrubbing column whereby NO contained in the waste gas was converted into $NO_2$ and, then, the waste gas was fed to the bottom of a scrubbing column comprising three Moredana plates having a free-space ratio of 0.38, where said gas was brought into counter-current contact with a circulating aqueous scrubbing solution having the following composition under the conditions shown below.

| Composition of the scrubbing solution: | |
|---|---|
| $(NH_4)_2SO_4$ | 0.67 mol/l |
| $(NH_4)_2SO_3$ | 0.13 mol/l |
| $(NH_4)_2S$ | 0.05 mol/l |
| Operating conditions: | |
| superficial gas velocity in the column | 5 m/sec |
| liquid-gas ratio (L/G) in the column | 3.5 |
| pH of the scrubbing solution | 7.8 |
| make-up amount of $(NH_4)_2SO_3$ | 18.4 kg/H |

NOx content in off-gas from the scrubbing column was not greater than 60 ppm.

COMPARATIVE EXAMPLE 2

A gas scrubbing test of the above waste gas was repeated using the same procedure as in Example 6 except that $(NH_4)_2S$ was not incorporated into the scrubbing solution. In order to obtain the same result as in Example 6, 147 kg/H of $(NH_4)_2SO_3$ had to be added into the scrubbing solution, which was much larger than that of Example 6.

EXAMPLE 7

1000 Nm³/H of waste gas containing 1000 ppm of NO and 1000 ppm of $NO_2$ was denitrogenated in the same manner as in Example 6, except that the scrubbing solution having the following composition was used instead of that used in Example 6 and the following operating conditions were adopted.

| Composition of the scrubbing solution: | |
|---|---|
| $Na_2SO_4$ | 0.8 mol/l |
| $Na_2SO_3$ | 0.2 mol/l |
| $Na_2S_2O_3$ | 0.1 mol/l |
| Operating conditions: | |
| superficial gas velocity in the column | 5 m/sec |
| liquid-gas ratio (L/G) in the column | 3.5 |
| pH of the scrubbing solution | 6.8 |
| make-up amount of $Na_2SO_3$ | 20 kg/H |

NOx content in off-gas from the scrubbing column was not greater than 60 ppm.

COMPARATIVE EXAMPLE 3

A gas scrubbing test of the above waste gas was repeated using the same procedure as in Example 7, except that $Na_2S_2O_3$ was not incorporated into the scrubbing solution. In order to obtain the same result as in Example 7, 142 kg/H of $Na_2SO_3$ had to be added into the scrubbing solution.

EXAMPLE 8

1000 Nm³/H of a plant waste gas containing 1000 ppm of NO and 1000 ppm of $NO_2$ was denitrogenated in the same manner as in Example 6, except that the following scrubbing solution and operating conditions were used instead of those used in Example 6.

| Composition of the scrubbing solution: | |
|---|---|
| $(NH_4)_2SO_4$ | 0.68 mol/l |
| $(NH_4)_2SO_3$ | 0.132 mol/l |
| $SC(NH_2)_2$ | 0.07 mol/l |
| Operating conditions: | |
| superficial gas velocity in the column | 5 m/sec |
| liquid-gas ratio (L/G) in the column | 3.5 |
| pH of the scrubbing solution | 7.8 |
| make-up amount of $(NH_4)_2SO_3$ | 18.4 kg/H |

NOx content in off-gas from the scrubbing column was not greater than 60 ppm.

COMPARATIVE EXAMPLE 4

A gas scrubbing test of the above waste gas was repeated using the same procedure as in Example 8, except that $(NH_4)_2S$ was not incorporated into the scrubbing solution. In order to obtain the same result as in Example 8, 147 kg/H of $(NH_4)_2SO_3$ had to be added into the scrubbing solution.

EXAMPLE 9

1000 Nm³/H of a plant waste gas containing 250 ppm of NO and 1000 ppm of $NO_2$ was denitrogenated in accordance with the following procedure.

130 ppm of $ClO_2$ was added into the waste gas at the feeding duct of the waste gas into the scrubbing column whereby NO contained in the waste gas was converted into $NO_2$ and, then, the waste gas was fed to the bottom of a scrubbing column comprising three Moredana plates having a free-space ratio of 0.38, where said gas was brought into countercurrent contact with a circulating aqueous scrubbing solution having the following composition under the conditions shown below.

| Composition of the scrubbing solution: | |
|---|---|
| $Na_2SO_3$ | 0.9 mol/l |
| $EDTA-Cu^{2+}$ | 0.03 mol/l |
| $SC(NH_2)_2$ | 0.15 mol/l |
| Operating conditions: | |
| superficial gas velocity in the column | 5 m/sec |

-continued

| liquid-gas ratio (L/G) in the column | 4 |
| pH of the scrubbing solution | 6.5 |
| make-up amount of $Na_2SO_3$ | 38 kg/H |

NOx content in off-gas from the scrubbing column was not greater than 15 ppm.

COMPARATIVE EXAMPLE 5

A gas scrubbing test of the above waste gas was repeated using the same procedure as described in Example 9, except that thiourea and EDTA chelate of $Cu^{2+}$ were not incorporated into the scrubbing solution.

Make-up amount of $Na_2SO_3$ was 320 kg/H and NOx content in off-gas from the scrubbing column was 30 ppm.

EXAMPLE 10

Absorption tests and oxidation tests were conducted by bubbling air containing 500 ppm of $NO_2$ and 1000 ppm of $SO_2$ into various absorbing solutions shown in Table 5 below. In the tests, air was continuously bubbled into flasks containing 500 ml of the various absorbing solutions having a temperature of 40° C, for 30 minutes at the rate of 10 liter/min.

The rates of absorption were obtained by determining the concentrations of SOx and NOx in the input and output gases of the flasks by using a conductometric SOx analyzer and a chemical luminescence type NOx analyzer, respectively. Further, the decreasing rates of the concentration of the sulfite ion in the absorbing solutions were obtained by determining the concentration of the residual sulfite in the air-blown absorbing solution with iodometric titration. The results were shown in Table 5 below.

EXAMPLE 11

10,000 $Nm^3$/H of a plant waste gas containing 550 ppm of $SO_2$, 200 ppm of NO and 50 ppm of $NO_2$ was scrubbed in accordance with the following procedure.

110 ppm of $ClO_2$ was added into the waste gas at the feed duct of the waste gas into the scrubbing column whereby NO contained in the waste gas was converted into $NO_2$ and, then, the waste gas was fed to the bottom of a scrubbing column comprising three Moredana plates having a free-space ratio of 0.38, where said gas was brought into countercurrent contact with a circulating aqueous scrubbing solution having the following composition under the conditions shown below.

| Composition of the scrubbing solution: | |
|---|---|
| $Na_2SO_3$ | 0.5 mol/l |
| $Na_2CO_3$ | 0.9 mol/l |
| $Na_2SO_4$ | 1.2 mol/l |
| $Na_2S_2O_3$ | 0.1 mol/l |
| Operating conditions: | |
| superficial gas velocity | 5 m/sec |
| liquid-gas ratio (L/G) | 4 |
| pH of scrubbing solution | 6.8 |
| make-up amount of NaOH | 20 kg/H |
| make-up amount of $Na_2SO_3$ | 0 |

The $SO_2$ and $NO_2$ contents, at the outlet of the scrubbing column, were 10 ppm or less and 15 ppm or less, respectively.

COMPARATIVE EXAMPLE 6

A gas scrubbing test of the above waste gas was repeated using the same procedure as in Example 11, except that $Na_2S_2O_3$ was not incorporated into the scrubbing solution.

Table 5

| Run No. | Composition of absorbing solution | | | pH of absorbing solution | Desulfurization rate (%) | Denitrogenation rate (%) | Decreasing rate of $SO_3^{2-}$ m mol/H |
|---|---|---|---|---|---|---|---|
| 1 | 0.18 | mol/l | $Na_2SO_3$ | 6.7 | 98 | 83 | 500 |
|   | 0.2  | mol/l | $Na_2CO_3$ |     |    |    |     |
| 2 | 0.18 | mol/l | $Na_2SO_3$ | 6.7 | 98 | 91 | 100 |
|   | 0.2  | mol/l | $Na_2CO_3$ |     |    |    |     |
|   | 0.13 | mol/l | $SC(NH_2)_2$ |   |    |    |     |
| 3 | 0.18 | mol/l | $Na_2SO_3$ | 6.7 | 98 | 94 | 105 |
|   | 0.2  | mol/l | $Na_2CO_3$ |     |    |    |     |
|   | 0.02 | mol/l | EDTA-$Cu^{2+}$ |  |    |    |     |
| 4 | 0.18 | mol/l | $Na_2SO_3$ | 6.7 | 98 | 96 | 55 |
|   | 0.02 | mol/l | $Na_2CO_3$ |     |    |    |     |
|   | 0.13 | mol/l | $SC(NH_2)_2$ |   |    |    |     |
|   | 0.02 | mol/l | EDTA-$Cu^{2+}$ |  |    |    |     |
| 5 | 0.18 | mol/l | $Na_2SO_3$ | 4.5 | 80 | 92 | 135 |
|   | 0.2  | mol/l | $Na_2CO_3$ |     |    |    |     |
|   | 0.13 | mol/l | $SC(NH_2)_2$ |   |    |    |     |
|   | 0.02 | mol/l | EDTA-$Cu^{2+}$ |  |    |    |     |
| 6 | 0.18 | mol/l | $Na_2SO_3$ | 6.7 | 98 | 96 | 45 |
|   | 0.2  | mol/l | $Na_2CO_3$ |     |    |    |     |
|   | 0.2  | mol/l | $SC(NH_2)_2$ |   |    |    |     |
|   | 0.03 | mol/l | EDTA-$Cu^{2+}$ |  |    |    |     |
| 7 | 0.18 | mol/l | $Na_2SO_3$ | 6.7 | 98 | 96 | 20 |
|   | 0.2  | mol/l | $Na_2CO_3$ |     |    |    |     |
|   | 0.26 | mol/l | $SC(NH_2)_2$ |   |    |    |     |
|   | 0.04 | mol/l | EDTA-$Cu^{2+}$ |  |    |    |     |
| 8 | 0.18 | mol/l | $Na_2SO_3$ | 8.0 | 98 | 96 | 20 |
|   | 0.2  | mol/l | $Na_2CO_3$ |     |    |    |     |
|   | 0.26 | mol/l | $SC(NH_2)_2$ |   |    |    |     |
|   | 0.04 | mol/l | EDTA-$Cu^{2+}$ |  |    |    |     |

The $SO_2$ and $NO_2$ contents at the outlet of the scrubbing column were 10 ppm or less and 20 ppm or less, respectively. Make-up amount of $Na_2SO_3$ was 230 kg/H.

EXAMPLE 12

10,000 $Nm^3/H$ of a plant waste gas containing 450 ppm of $SO_2$, 250 ppm of NO and 100 ppm of $NO_2$ was scrubbed as described in Example 11, except that 130 ppm of $ClO_2$ was added into the waste gas and the following scrubbing solution and operating conditions were used.

| Composition of the scrubbing solution: | |
|---|---|
| $(NH_4)_2SO_3$ | 0.5 mol/l |
| $Na_2SO_4$ | 1.2 mol/l |
| $(NH_4)_2CO_3$ | 0.5 mol/l |
| $SC(NH_2)_2$ | 0.1 mol/l |
| $EDTA-Cu^{2+}$ | 0.03 mol/l |
| Operating conditions: | |
| superficial gas velocity | 5 m/sec |
| liquid-gas ratio (L/G) | 4 |
| pH of scrubbing solution | 6.8 |
| make-up amount of $NH_4OH$ | 16.4 kg/H |
| make-up amount of $(NH_4)_2SO_3$ | |

The $SO_2$ and $NO_2$ contents, at the outlet of the scrubbing column, were 10 ppm or less and 15 ppm or less, respectively.

COMPARATIVE EXAMPLE 7

A gas scrubbing test of the above waste gas was repeated using the same procedure as in Example 12, except that thiourea and $EDTA-Cu^{2+}$ were not incorporated into the scrubbing solution.

The $SO_2$ and $NO_2$ content at the outlet of the scrubbing column were 10 ppm or less and 30 ppm or less. Make-up amount of $(NH_4)_2SO_3$ was 320 kg/H.

What is claimed is:

1. In a process for removing sulfur oxides from a waste gas containing the same and oxygen comprising contacting said gas with an aqueous scrubbing solution of the sulfite of at least one selected from the group consisting of alkali metals and ammonium in a scrubber; the improvement wherein
    a. said scrubbing solution contains as an oxidation retardant thiourea in an amount of at least 0.0001 mol/l in the scrubbing solution, wherein the retardant depresses the oxidation reaction of the sulfite with oxygen contained in the waste gas, and
    b. the pH of said scrubbing solution is at least 6.

2. The process as claimed in claim 1, wherein the amount of said oxidation retardant is in the range from 0.001 to 0.1 mol/l in the scrubbing solution.

3. The process as claimed in claim 1, wherein the pH of said scrubbing solution is in the range from 7 to 8.5.

4. In a process for removing nitrogen oxides from a waste gas containing the same and oxygen comprising the steps of adding chlorine or ozone to the gas whereby nitrogen monoxode contained in the gas is converted into nitrogen dioxide and/or dinitrogen trioxide and, then, contacting the gas with an aqueous scrubbing solution of the sulfite of at least one selected from the group consisting of alkali metals and ammonium in a scrubber; the improvement wherein
    a. said scrubbing contains at least one oxidation retardant selected from the group consisting of the sulfide, polysulfide or thiosulfate, of alkali metals or ammonium and thiourea in an amount of at least 0.03 mol/l in the scrubbing solution wherein the retardant depresses the oxidation reaction of the sulfite with oxygen contained in the waste gas,
    b. the pH of said scrubbing solution is at least 5, and
    c. said scrubbing solution further contains either one or both of the copper and iron ions in an amount of at least 0.003 mol/l in the scrubbing solution.

5. The process as claimed in claim 4 wherein said oxidation retardant is at least one selected from the group consisting of sodium sulfide, sodium polysulfides, potassium sulfide, potassium polysulfides, ammonium sulfide and ammonium polysulfides.

6. The process as claimed in claim 4, wherein said oxidation retardant is at least one selected from the group consisting of sodium thiosulfate, potassium thiosulfate, ammonium thiosulfate and thiourea.

7. The process as claimed in claim 4, wherein the amount of said oxidation retardant is in the range from 0.05 to 0.4 mol/l in the scrubbing solution.

8. The process as claimed in claim 4 wherein the pH of said scrubbing solution is in the range from 6.5 to 8.5.

9. The process as claimed in claim 4, wherein the amount of said copper and/or iron ion is in the range from 0.01 to 0.04 mol/l in the scrubbing solution.

10. In a process for removing sulfur oxides and nitrogen oxides from a waste gas containing the same and oxygen comprising the steps of adding chlorine dioxide or ozone to the gas whereby nitrogen monoxide contained in the waste gas is converted into nitrogen dioxide and/or nitrogen trioxide and, then, contacting the gas with an aqueous scrubbing solution of the sulfite of at least one selected from the group consisting of alkali metals and ammonium in a scrubber; the improvement wherein
    a. said scrubbing solution contains at least one oxidation retardant selected from the group consisting of the sulfide, polysulfide or thiosulfate of alkali metals or ammonium and thiourea in an amount of at least 0.03 mol/l in the scrubbing solution, whereby said oxidation retardant substantially prevents oxidation reaction of the sulfite with oxygen contained in the waste gas such that it is available for reducing nitrogen oxides,
    b. the pH of said scrubbing solution is at least 5, and
    c. said scrubbing solution further contains either one or both of the copper and iron ions in an amount of at least 0.003 mol/l in the scrubbing solution.

11. The process as claimed in claim 10 wherein said oxidation retardant is at least one selected from the group consisting of sodium sulfide, sodium polysulfides, potassium sulfide, potassium polysulfides, ammonium sulfide and ammonium polysulfides.

12. The process as claimed in claim 10, wherein said oxidation retardant is at least one selected from the group consisting of sodium thiosulfate, potassium thiosulfate, ammonium thiosulfate and thiourea.

13. The process as claimed in claim 10, wherein the amount of said oxidation retardant is in the range from 0.05 to 0.4 mol/l in the scrubbing solution.

14. The process as claimed in claim 10, wherein the pH of said scrubbing solution is in the range from 6.5 to 8.5.

15. The process as claimed in claim 10, wherein the amount of said copper and/or iron ion is in the range from 0.01 to 0.04 mol/l in the scrubbing solution.

16. The process as claimed in claim 10, wherein said aqueous scrubbing solution further contains the hydroxide or the bicarbonate of at least one selected from the group consisting of alkali metals and ammonium, whereby said sulfite is prepared by the reaction of the sulfur oxides with said hydroxide or said bicarbonate.

17. In a process for removing nitrogen oxides from a waste gas containing the same and oxygen comprising the steps of adding chlorine dioxide or ozone to the gas whereby nitrogen monoxide contained in the gas is converted into nitrogen dioxide and/or dinitrogen trioxide and, then, contacting the gas with an aqueous scrubbing solution of the sulfite of at least one selected from the group consisting of alkali metals and ammonium in a scrubber; the improvement wherein a, said scrubbing solution contains as an oxidation retardant thiourea in an amount of at least 0.03 mol/l in the scrubbing solution wherein the retardant depresses the oxidation reaction of the sulfite with oxygen cotained in the waste gas, and b, the pH of said scrubbing solution is at least 5.

18. The process as claimed in claim 17, wherein the amount of said oxidation retardant is in the range from 0.05 to 0.4 mol/l in the scrubbing solution.

19. The process as claimed in claim 17, wherein the pH of said scrubbing solution is in the range from 6.5 to 8.5.

20. In a process for removing sulfur oxides and nitrogen oxides from a waste gas containing the same and oxygen comprising the steps of adding chlorine dioxide or ozone to the gas whereby nitrogen monoxide contained in the waste gas is converted into nitrogen dioxide and/or dinitrogen trioxide and, then, contacting the gas with a aqueous scrubbing solution of the sulfite of at least one selected from the group consisting of alkali metals and ammonium in a scrubber; the improvement wherein a, said scrubbing solution contains as an oxidation retardant thiourea in an amount of at least 0.03 mol/l in the scrubbing solution whereby said oxidation retardant substantially prevents oxidation reaction of the sulfite with oxygen contained in the waste gas such that it is available for reducing nitrogen oxides, and b. the pH of said scrubbing solution is at least 5.

21. The process as claimed in claim 20 wherein the amount of said oxidation retardant is in the range from 0.05 to 0.4 mol/l of the scrubbing solution.

22. The process as claimed in claim 20, wherein the pH of said scrubbing solution is in the range from 6.5 to 8.5.

* * * * *